(12) United States Patent
Simmel

(10) Patent No.: US 7,144,481 B2
(45) Date of Patent: Dec. 5, 2006

(54) ENDLESS STEEL BAND FOR A BELT PRESS

(75) Inventor: Johannes Günther Simmel, Krensdorf (AT)

(73) Assignee: Berndorf Band GmbH & Co., Berndorf (AT)

( * ) Notice: Subject to any disclaimer, the term of this patent is extended or adjusted under 35 U.S.C. 154(b) by 401 days.

(21) Appl. No.: 10/699,650

(22) Filed: Nov. 4, 2003

(65) Prior Publication Data

US 2004/0250707 A1   Dec. 16, 2004

(30) Foreign Application Priority Data

Nov. 4, 2002   (AT) .............................. A 1661/2002

(51) Int. Cl.
| | |
|---|---|
| *D21H 27/02* | (2006.01) |
| *B30B 5/06* | (2006.01) |
| *B31F 1/07* | (2006.01) |
| *B29C 43/48* | (2006.01) |
| *B29C 39/16* | (2006.01) |

(52) U.S. Cl. ...................... 162/362; 162/205; 162/361; 264/119; 425/371; 100/151

(58) Field of Classification Search ........ 162/205–207, 162/116, 117, 361, 362, 358.2, 358.4, 358.5, 162/381, 900–904; 425/363–374; 164/138; 264/119; 156/580, 583.5; 100/37, 38, 151, 100/154, 311; 428/156, 167, 169, 174, 573, 428/576, 596, 597, 600–604, 687; 144/358

See application file for complete search history.

(56) References Cited

U.S. PATENT DOCUMENTS

| | | | | | |
|---|---|---|---|---|---|
| 4,557,778 | A | * | 12/1985 | Held | ........................... 156/209 |
| 4,573,404 | A | * | 3/1986 | Held | ........................... 100/151 |
| 5,021,102 | A | * | 6/1991 | Harreither | ................... 148/518 |
| 5,088,398 | A | * | 2/1992 | Bielfeldt | ..................... 100/154 |
| 5,183,551 | A | * | 2/1993 | Werthmann | .................. 205/70 |
| 6,436,553 | B1 | * | 8/2002 | Stadler et al. | ............. 428/600 |
| 6,908,295 | B1 | * | 6/2005 | Thielman et al. | ........... 425/371 |

FOREIGN PATENT DOCUMENTS

DE         29 50 795      *   6/1981

* cited by examiner

*Primary Examiner*—Eric Hug
(74) *Attorney, Agent, or Firm*—Jacobson Holman PLLC

(57) ABSTRACT

Endless steel band for belt presses, especially double belt presses, with a thickness between 2 mm to 4 mm, preferably 2.5 mm to 3.5 mm, which is turned around on drums of the belt press, and whose surface has a maximum medium roughness up to RZ 50.5 μm, in which a plurality of depressions are provided starting from the surface of the steel strip and extending into the steel strip, the depressions being substantially evenly distributed and reaching from the surface of the steel strip 200 μm to 600 μm deep into the steel band. Such steel band can be used for the production of plates, preferably wood-based plates, especially chipboards, with elevations.

20 Claims, 3 Drawing Sheets

ENDLESS STEEL BAND FOR A BELT PRESS

BACKGROUND OF THE INVENTION

1. Field of the Invention

The present invention generally relates to an endless steel band for a belt press and the use of the endless steel band for the production of chipboard.

2. Description of the Prior Art

Double-belt plants for producing strands of any length from cold hardened or duroplastic materials are known from examples in EP 0 732 183 A. In these double-belt plants, steel bands with a thickness of from 2.8 mm to 3.5 mm are used. Such bands must have high flexibility, as they are applied on drums with a diameter, for example, between 1.5 m and 3 m. After the bands are applied, they are be driven in the belt press. In order to form certain structures, such as raised wood grains, on the surface of a 1.2 mm thick melamine resin plate, it is known to first form corresponding structures, such as depressions, on the surface of the steel bands. Then the steel band presses the resin plate and the raised wood grains can be obtained on the final product. Such depressions on the steel bands are obtained by etchings, especially with ferric chloride solution. The formats of the structures are usually fixed photographically or digitally. The starting material for making the steel band with surface structures is usually a steel band with a polished surface, which has a roughness of RZ 50 µm. Generally, the depressions are usually shallow on the surface of the steel band, because there is the fear that the steel band with deep depressions on its surface may not resist the tension strains. Usually, steel bands are held under pressure by the drums situated at both ends of the band. In addition, the band may prematurely break when it is applied to the belt press.

Chipboards normally have substantially plain and smooth surfaces, which are required for further uses, such as, gluing with decoration plates and similar materials. The smooth surface that is not skid resistant is also known in plastic plates used, for example, in the sanitary field. However, under certain circumstances, chipboards must be skid resistant. For example, chipboards may be walked on or used in a wet environment. Chipboards may also be inclined at an angle of 60° relative to a horizontal surface. The skid resistance can be determined by testing the angle relative to a horizontal surface at which the skidding takes place.

Different processes are known in order to obtain such antiskid chipboards. Initially, an additional sheet is provided between a band and the plastic material to be pressed during the pressing process. Although a steel sheet is used, its life is, e.g. 4,000 to 8,000 hours, which is relatively short.

In a later development, the plastic material that is already substantially hardened is pressed with embossing rollers to form depressions on the chipboards. Depressions on the chipboard have several disadvantages. If the surface is polluted, the adhesion with other materials is difficult. In addition, depressions cause damages in the structure and the stability of the chipboard is reduced. Sometimes, the chips and the wood glue tend to swell, as there is no more seal on the chipboard surface.

SUMMARY OF THE INVENTION

The object of the present invention is to widen the use of a band press, especially a double band press, in order to obtain an antiskid structure on the surface of the product to be produced, without additional mechanical devices, such as embossing rollers or an additional sheet, and without changing, or changing only slightly, the lifetime of the endless steel band comparing with a steel band without surface structures.

The endless steel band for belt presses, especially double belt presses, according to the present invention, has a thickness of between 2 mm to 4 mm, especially between 2.5 mm and 3.5 mm. The endless steel band is applied on a drum of the belt press and its surface has a maximum medium roughness of up to RZ 50.5 µm, where depressions are provided starting from the surface of the steel band and extend into the inside of the steel band of the endless band. The depressions are substantially evenly distributed and extend from the surface of the steel band 200 µm to 600 µm into the steel band.

The thickness of the steel bands of between 2 mm to 4 mm is especially important for the diameter of the drums, on which they are to be turned around, because the thicker the band, the higher is the bending strain. When the thickness increases, the tensile strength of the band is also increased. Steel bands with a thickness of 2.5 mm to 3.5 mm normally have the required values of bending strength and fatigue strength under reversed bending stresses. A further essential property of the bands is the maximum roughness. In order to obtain the highest possible constant skid resistance on a surface, it is necessary that the depressions are arranged substantially evenly over the surface of the steel strip. Depressions of 200 µm to 600 µm deep in the steel band allow the necessary skid resistance on the final product. In addition, the depressions do not negatively affect the stability of the band.

In addition to the depressions of 200 µm to 600 µm deep, further depressions of less than 200 µm deep may also be provided for achieving optimal results or for increasing skid resistance.

Each of the depressions, preferably, measured on the surface of the steel band, has a cross sectional area of at least 2 mm$^2$, especially 3 mm$^2$. Thus, a large portion of the surface of the final product is retained to provide enough stability.

Preferably, the direction of the depression extending into the surface of the steel band follows a trajectory that represents a continuously and differentiable curve in a cross section normal to the surface of the steel band. Thus, straight vertical notches are avoided. In addition, the plastic material being pressed can be particularly easily detached from the band.

The depression, preferably, has a curved bottom portion represents a continuously and differentiable curve in a cross section normal to the surface of the steel band. Thus, straight vertical flat bottom notches are avoided. In addition, the hardened plastic material pressed by the band can be easily withdrawn out of the depression. It is particularly advantageous if the depression is circle-shaped in cross section parallel to the surface of the steel strip of the band. If the depression is oblong on the surface of the steel strip, certain preferred directions for skid resistance can be achieved.

The depressions, preferably, are arranged in lines that are parallel to one another. Such depressions can be manufactured particularly simply. For example, it is only necessary to keep the band in complete rotation, arrange a corresponding number of milling cutters or similar on a carrier, and just raise and lower the carrier during the rotation of the band.

Preferably, the depressions of two adjacent lines include an angle smaller than 180°, especially smaller than 160°, such depressions can be obtained by lowering the carrier with the milling cutters or similar device, and by moving it during the rotation of the band in one direction, then detaching it and lowering it again and then moving it in the other direction.

The depressions are preferably made by stock removal, through which a particularly smooth surface can be achieved by simple means.

The depressions can also be made by rolling, especially cold rolling. A particularly high quality surface can also be achieved by this method. At the same time, the hardening of the surface can be obtained.

EP 0 820 833 B discloses a device and a process to cut out defective areas of a band, either mechanically or by plasma burners or other similar means. However, to insert a prefabricated round steel plate with equal thickness, the steel strips and the round plates to be welded do not have surface structures. According to the present invention, it is provided that such prefabricated round plates, which have depressions like the steel strip on the band, can be made available for repairing the bands. The round plates can be selected so that the depressions on the plate match those on the bands. During welding, additional mechanical treatments can be done, so that there are no defective areas as to skid resistance or aesthetics.

According to the present invention, one of the uses of the steel band is to produce plates, especially wood-based plates, e.g. in chipboards, with elevations. Such plates can be produced continuously, using a steel band according to the present invention, without additional devices like embossing rollers, sheet or the like.

The steel band can be used for the production of chipboards, with chips that have a length of from about 120 mm to about 300 mm and especially have a thickness of from 0.5 mm to 2.5 mm. It was quite surprising that although the wood chips are big, the necessary elevations can be achieved in a simple and homogeneous way.

The use of an endless steel band is also particularly suitable for the production of chipboards with chip layers orientated parallel to one another.

A further use according to the present invention is the production of plates from plastic, especially acrylates, with elevations. Such plates can be either flat or deformed for use in antiskid areas, as they are suitable for bathtubs and are dimpled plastic plates. In such cases, the band can be formed in such a way that only certain areas have the depressions, i.e. those areas that need to be skid resistant, whereas other areas have a suitable roughness, e.g. for easy cleaning.

DESCRIPTION OF THE PREFERRED EMBODIMENT

Figure 1:
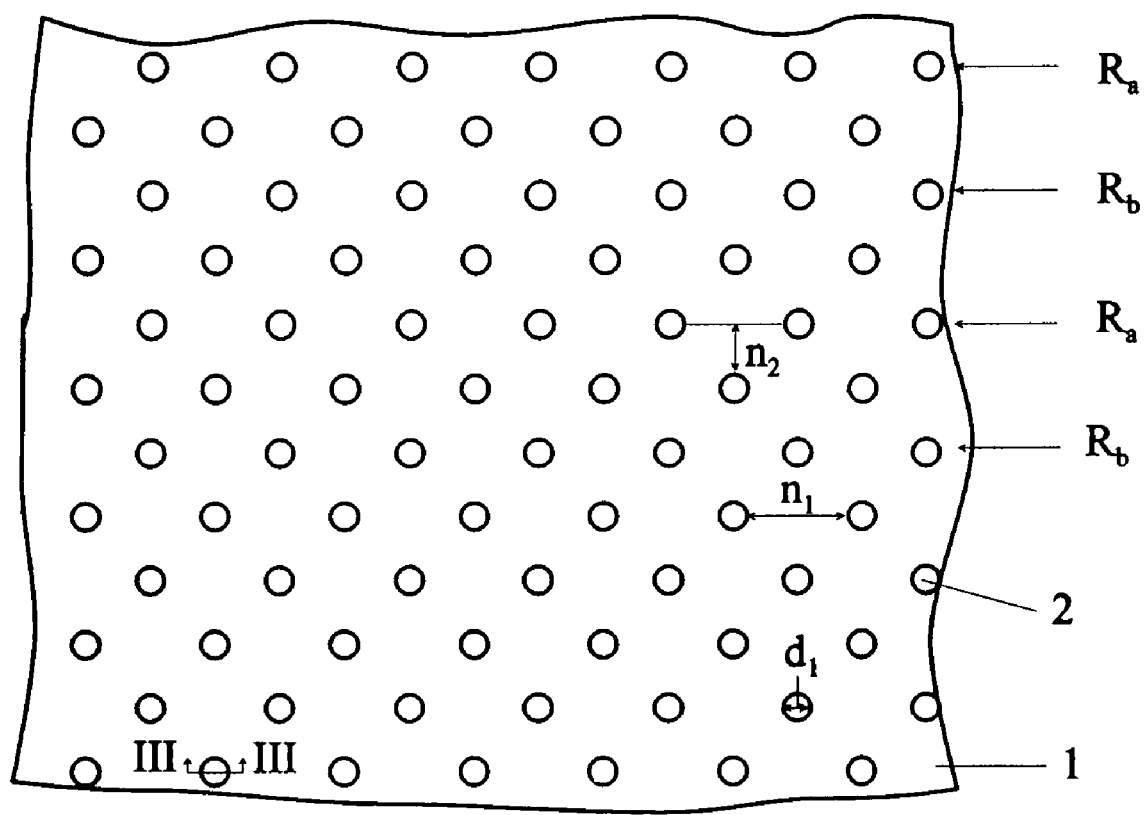
FIG. 1 is a top plan view of part of a steel band with circular depressions.

In the following, the present invention is explained in more details by the drawings and examples. FIG. 1 shows the details of a portion of an endless steel band 1 of Cr Ni Ti 15 7 that has a thickness of 2.6 mm, a width of 3.0 m and a length of 100 m. The band is provided for use on a double belt press with a diameter of the drum at the exit part being 2.2 m and at the entry part, 1.80 m. In the double band plant and near the heating plates, there is a roller table made of rollers situated one after the other, in which each of the rollers has a diameter of 1.8 cm, thus causing an additional deformation of the band. As FIG. 1 shows, the band has circular depressions 2, each of which has a diameter $d_1$ of 2 mm. The series of depressions $R_a$ and $R_b$ are at a distance $n_2$, which is half of the normal distance $n_1$ between the circular depressions within the series. $R_a$ and $R_b$ appear alternatively. The normal distance n1 is 2 cm. The circular depressions can be produced particularly advantageously by cold rolling.

Figure 3:
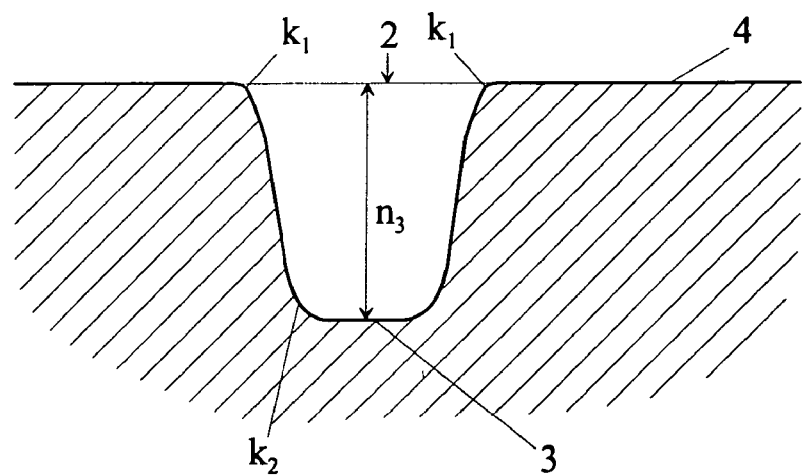
FIG. 3 is a cross section view of a circular depression according to line III—III in FIG. 1.

FIG. 3 shows the cross section view through a circular depression 2, in which the lower end 3 of the depression has a normal distance $n_3$ of 400 μm from the surface 4 of the band with a roughness RZ 40.0 μm.

The extension of the depression 2 towards the surface 4 is formed in the form of a continuously and differentiable proceeding curve $k_1$ in cross section normal to the band surface 4. In addition, a continuously and differentiable proceeding curve $k_2$ is the shape at the end 3 of the depression in cross section normal to the band surface 4.

Figure 2:
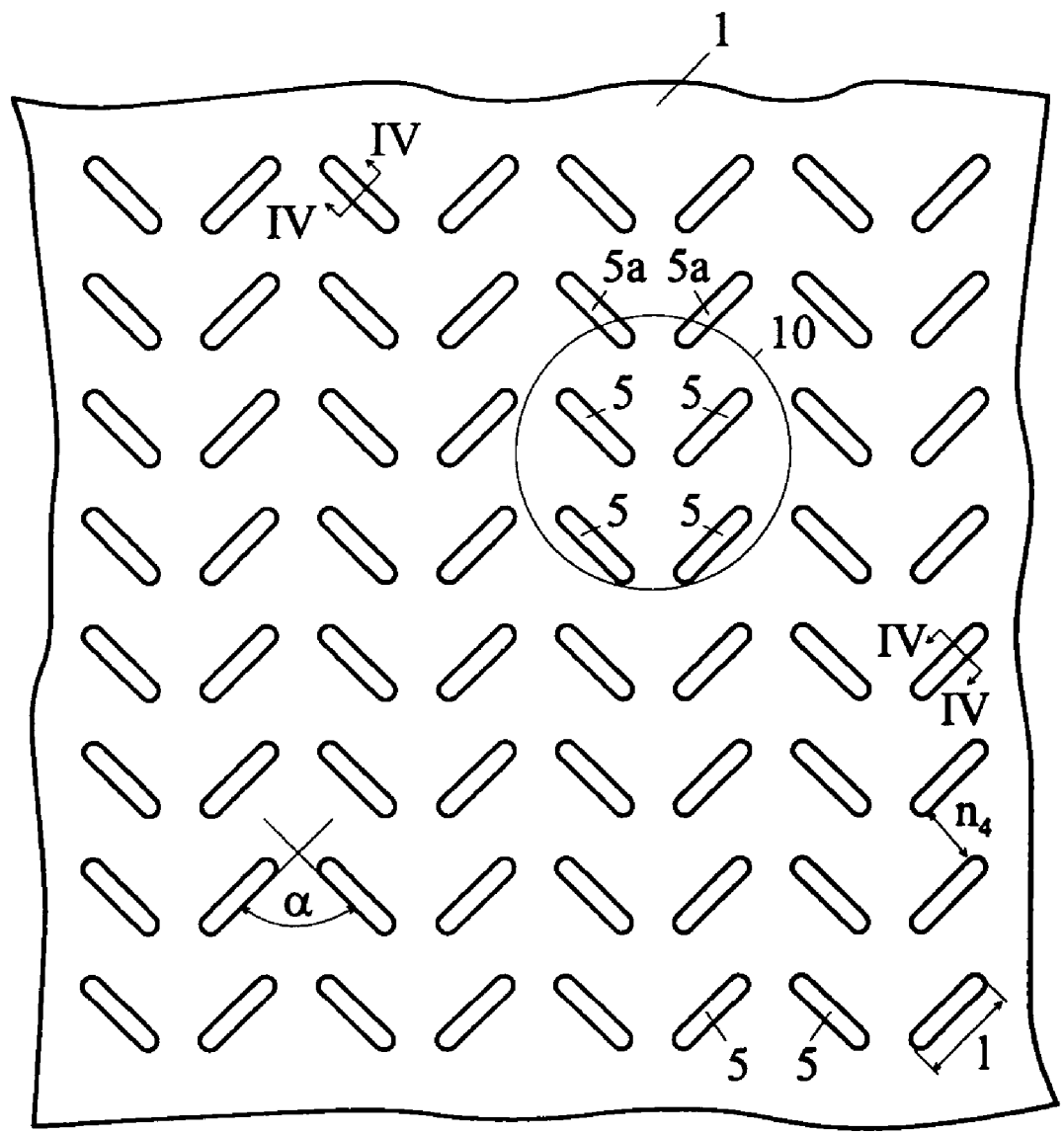
FIG. 2 is a top plan view of part of a steel band with depressions arranged in fishbone shape.
Figure 4:
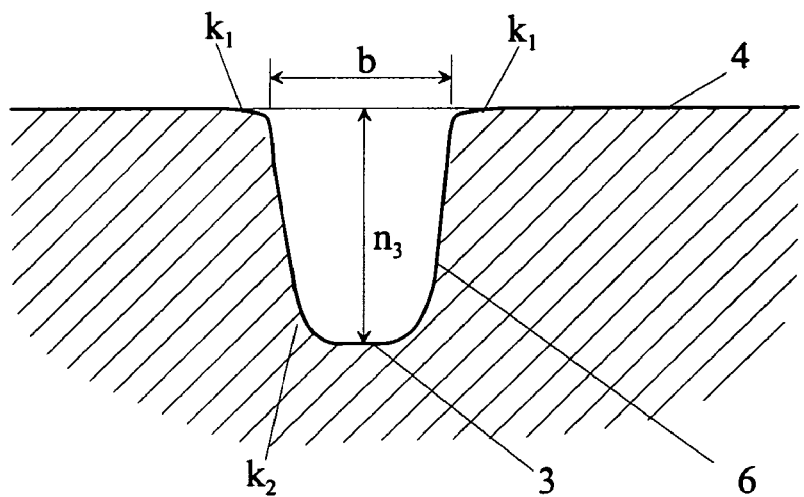
FIG. 4 is a cross section view of a depression according to line IV—IV in FIG. 2.

FIG. 2 shows further details of an endless steel band 1 made of Cr Ni Ti 15 7, in which oblong milled depressions 5 are provided, with one towards the other having a length 1 of 20 mm and a normal distance $n_4$ of 15 mm. As shown in FIG. 2, the oblong depressions 5 form a fishbone-shaped design in the endless steel band. Looking at FIG. 4, the walls 6 are inclined towards the inside, so that there are recesses tapered downwards and the normal distance $n_5$ of the lower end 3 from the surface of the steel strip is 350 μm. The width b of the oblong depressions on the surface 4 of the band is 3.500 μm. The depressions 5 are oriented at an angle α of 105°, see FIG. 2.

A round plate 10 is welded into the steel band I, which has depressions 5 and 5a. The depressions 5a continue in the band 1. By means of the welded round plate 10, which is prefabricated, any damage to the band can be repaired, the depressions are complete, and the depressions in the welding area have a regular form.

The extension of the depression 2 towards the surface 4 is formed in the shape of a continuously and differentiable proceeding curve $k_1$ in cross section normal to the band surface 4. In addition, a continuously and differentiable proceeding curve $k_2$ is the shape at the end 3 of the depression in cross section normal to the band surface 4.

Figure 5:
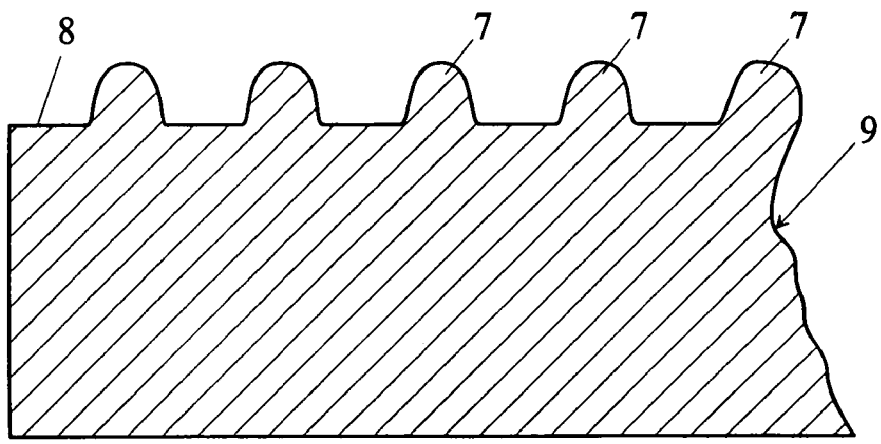
FIG. 5 is a cross section view of a chipboard with elevations analogous to the depressions in FIG. 1.

FIG. 5 shows the cross section view of a plate produced with a section of an endless steel band according to FIG. 1, in which the elevations 7 are represented partially in a section view and partially in elevational view. Elevations 7 rise from the surface 8 of the chip plate 9 by 400 μm.

EXAMPLE 1

In a laboratory, a section of an endless band according to FIG. 1 with an area of 200 mm×400 mm, a roughness of RZ 40 μm and a thickness of 2.8 mm was used to press one chip material with an volume of 30 mm×10 mm×2.0 mm (30 weight %), and another chip material with a volume of 80 mm×20 mm×1.5 mm (50 weight %) which is longitudinally orientated ¼ and rest of the materials being smaller than 30 mm×10 mm×2.0 mm. There were parallel orientated chip layers. The endless bands were operated at 235° C. with a pressure of 45 kp/cm², and were operated for three minutes. The resulting plate with a thickness of 18 mm has elevations of 400 μm according FIG. 1. For ten such metallic stripes, bending strength, fatigue strength under reversed bending stresses and tensile strength were examined. The following mean values were obtained: 80% specimens were without rupture in case of $2 \times 10^6$ load changes (survival probability) and in the pulsating tensile stress test 450 N/mm². Corresponding values for an endless band without recesses are 450 N/mm tension horizon and 100% up to $2 \times 10^6$ load changes, measured according to DIN 50 100 (pulsating tensile stress test).

The skid resistance was ascertained as follows: the chipboard was produced according to Example 1. The surface was loaded with 20 g water per 100 cm², and the tests were performed at 20° C. The chipboard was loaded with a work shoe Mod. 431, size 43 of the company Rukapol Arbeitsschutz GmbH, Steyr, Austria, and an additional weight of 15 kp was evenly distributed. The inclination of the surface as to the horizontal line was changed until a skid movement occured. The medium skid angle was 52° with the smooth plate and 65° with the plate having surface structures.

EXAMPLE 2

According to Example 1, a chipboard with the embodiment according to FIG. 2 was produced. A specimen was taken, in which the oblong elevations including an angle of 45° with the longitudinal direction of the specimen. It was then displaced according to Example 1, and skid movement occurred at 62°.

EXAMPLE 3

In the laboratory, using a section of an endless band according to FIG. 1, measured at 200 mm×400 mm, having a roughness of RZ 40 μm and a thickness of 2.8 mm, press an acrylic material (polymetha-methyl-acrylate), which was hardened under pressure at 0.1 bar and a temperature of 80° C. for 30 minutes. The thickness of the acrylic plate was 12 mm. The skid resistance was ascertained like in Example 1, the surface had additional weight of 15 kp, the sole surface of a shoe size 43 having a shore hardness A of ≦80, which corresponds roughly to the shore hardness of an adult's shoe sole. It was then displaced according to Example 1, and the skid movement occurred at 58°, whereas with non-structured surfaces the skid movement occurred at 47°.

What is claimed is:

1. An endless steel band for belt presses to produce a product with an improved constant skid resistance surface, especially double belt presses, said endless steel band with a thickness of between 2 mm to 4 mm is turned around on drums of the belt press, and whose surface has a maximum medium roughness of up to RZ 50.5 μm; a plurality of depressions being provided, starting from a surface of the steel band and extending into the steel band, wherein the depressions are substantially evenly distributed, and the depressions extend inwardly 200 μm to 600 μm from the surface of the steel band.

2. The endless steel band according to claim 1, characterized in that, in addition to the depressions of 200 μm to 600 μm deep, further depressions of less than 200 μm deep are also provided.

3. The endless steel band according to claim 1, characterized in that each of the depressions, measured on the surface of the steel band, has a cross sectional area of at least 2 mm².

4. The endless steel band according to claim 3, characterized in that the cross sectional area is at least 3 mm².

5. The endless steel band according to claim 1, characterized in that at least one of the depressions extends into the surface of the steel band following a direction that represents a continuously and differentiable curve in a cross section normal to the surface of the steel band.

6. The endless steel band according to claim 1, characterized in that at least one of the depressions has a curved bottom having a continuously and differentiable curve in a cross section normal to the surface of the steel band.

7. The endless steel band according to claim 1, 2 or 3, characterized in that at least one of the depressions in a cross section parallel to the surface of the steel band is circle-shaped.

8. The endless steel band according to claim 1, 2 or 3, characterized in that at least one of the depressions in a cross section parallel to the surface of the steel band is oblong-shaped.

9. The endless steel band according to claim 8, characterized in that the depressions are arranged in lines that are parallel to one another.

10. The endless steel band according to claim 9, characterized in that the depressions of two adjacent lines form an angle less than 180°.

11. The endless steel band according to claim 10, characterized in that the angle is less than 160°.

12. The endless steel band according to claim 1, characterized in that the depressions are made by stock removal.

13. The endless steel band according to claim 1, characterized in that the depressions are produced by rolling.

14. The endless steel band according to claim 1, characterised in that the thickness of the steel band is between 2.5 mm to 3.5 mm.

15. A weldable round plate for replacing defective areas of the steel band according to claim 1, characterized in that an area on the round plate has a plurality of depressions corresponding to the steel band.

16. A method of producing a plate with elevations by belt presses comprising the step of: utilizing an endless steel band according to claim 1.

17. The method according to claim 16, wherein a chipboard with elevations is produced.

18. The method according to claim 17, characterized in that the chipboard has a plurality of chips with a length from about 120 mm to about 300 mm and preferably a thickness from 0.5 mm to 2.5 mm.

19. The method according to claim 17, characterized in that the chipboard has chip layers parallel to one another.

20. A method of producing plates from plastic, including acrylates, with elevations, comprising the step of utilizing an endless steel band according to claim 1.

* * * * *